Patented July 4, 1944

2,353,000

UNITED STATES PATENT OFFICE 2,353,000

METHOD OF FORMING ARTICLES OF PLASTIC MATERIAL

Arthur O. Austin, near Barberton, Ohio, and Leslie W. Austin, near San Jose, Calif.

No Drawing. Application February 7, 1939, Serial No. 255,068

14 Claims. (Cl. 25—156)

This invention relates to the formation of articles from plastic material such as clay or other substances that can be shaped by forming tools or in molds and has for some of the objects increased ease of forming articles from plastic material, the formation of shapes not previously practical to form, decrease of the time required for forming operation, the possibility of substituting metal forming parts for plaster in many cases, the reduction in labor and power costs, the reduction or elimination of sponging operations, decreased deformation of the ware in forming operation, reduced checking and drying losses, and the formation of parts from a reduced amount of material. Other objects and advantages will appear from the following description.

In the forming of ceramic ware and particularly ware made from wet plastic clay it is customary to use a mold to form one side of the piece of ware or blank, and a jigger tool or a metal plunger for forming the other side. In order to obtain accuracy the method in which a metal die or plunger is used to form the piece has many advantages in some classes of ware. This is particularly true in the electric insulator art.

Where plastic material is used the air pressure will cause the material to adhere to the face of the forming tool or die unless some means is used to relieve the pressure or break the vacuum between the material and contacting face. Several methods have been used to produce this result, one of which is to cover the forming member with fabric. Another is to use a rotating member which is heated. In addition to the heating, valves communicating with the atmosphere frequently are inserted in the face of the forming member or plunger. In order to reduce friction oil frequently is applied to the surface of the plastic clay.

Forming tools or plungers generally are heated by gas or by electric heating elements. The object of heating is to reduce the friction and to break the vacuum when the forming die is removed from the surface of the piece. The heat tends to vaporize moisture in the clay and volatile constituents in the lubricating oil, thus producing gas or vapor between the face of the heated tool and the plastic material, which facilitates separation of the surfaces. While the above method is very widely used, particularly in the forming of wet process insulators, it is subject to limitations which it is desirable to remove, not only to increase production, but to make the method applicable to forming other ceramic articles.

In the present invention an improved method is provided in which an emulsion is incorporated with the clay. This may be incorporated in the slip before pressing or in the clay during the pugging or kneading operation. The method has the advantage that uniform characteristics can be obtained in the clay and the personal element which enters into the question of oiling the clay or forming plunger is eliminated.

Where the surface of the clay or forming tool is oiled an excess of oil generally is necessary in order to insure releasing. Unless an excess of oil is used the flow of the clay is likely to remove oil from some portion and cause an uneven release of the forming tool. In addition any unevenness in the distribution of the oil is likely to cause a partial sticking of the piece. This tends to warp the piece or deform it during the operation. In many cases excessive heat must be applied to the forming tool in order to cause a proper release. This produces a rough surface on the piece being formed particularly where the contact of the forming plunger must be exerted long enough to allow the clay to flow in forming a difficult or complicated piece.

In the improved method greater latitude is provided and the time of forming is reduced. More complicated metal forming molds or dies can be used and the cost of removing the oil is eliminated. In the improved method where a suitable emulsion is incorporated with the clay, the metal forming parts can be heated in any desired way such as methods in use at the present time, or if desired a greatly improved method may be provided in which the forming part is heated with a liquid or a vapor circulated through the forming tool and having a definite temperature. This can be readily obtained by the use of water where the desired temperature is below the boiling point, or by the use of oil for higher temperatures. Steam or other vapors also can be used to provide a definite temperature. In this method the forming tools have a backing or face heated by means of the liquid or vapor. With this method there is no danger of overheating as in the case where electrical heating or gas is used. By using an emulsion it is possible to distribute material throughout the plastic composition which will volatilize at the temperature and pressure of the forming die or plunger. Where an emulsion is used which will release at moderate temperatures the latitude in time during which the forming die or plunger may be in contact with the plastic material is greatly increased.

Where oil is used as has heretofore been the practice for lubrication of dies, folds in the clay may include some of this oil. This prevents adjacent sections along the fold from uniting, resulting in a defective piece. However with the emulsion the composition is uniform and folds are not serious as in the case of oil surfaces, because the emulsion will not prevent the adjacent surfaces from uniting as will a layer of oil. This is of very great value particularly where there is likely to be an appreciable clay flow across the face of a forming die or tool. The present invention also permits the use of metal forming members for both the outside and inside of the piece. In addition to providing a greatly increased latitude in forming operations the present invention permits metal molds to replace plaster molds in many cases.

In addition to the advantages enumerated the invention eliminates much hand labor required for removing the oil film in the ordinary operation. In the ordinary forming operation in which oil is used as a lubricant the oil tends to seal the surface and prevent the evaporation of moisture. This allows one face of the piece of ware to dry, while drying is retarded on the other face. This results in warping and produces a strain which may result in the cracking of the ware in the green state.

In order to permit uniform drying the surface, where it has been oiled, must be sponged so as to remove or break up the oil film to allow drying. The sponding operation not only requires considerable labor but frequently is very difficult to carry out as the plastic clay when first formed is very soft and readily deformed by the sponging operation.

In addition to the application of the improved method of forming ceramic articles such as insulators, dishes, flower pots, tile, and other articles the invention may be applied to facilitate the forming of dry process or dust ware. In the forming of dry process material such as knobs, cleats, switch bases, and many other articles it is customary to mix oils with the clay or to oil the dies during the forming of each piece. As the oil is not compressible to any great extent accumulations of oil or particles of oil prevent the contact of adjacent particles of the damp clay which are in small pieces resembling sawdust. The space occupied by the particles or accumulation of oil leaves voids or produces an open structure in the finished piece. In the forming operation it is also difficult to provide uniform oiling of the dies and to insure uniform distribution of oil where the oil is mixed with the damp clay dust. However where an emulsion is mixed with the clay it is not necessary to use oil in the forming of the piece. This results in a material saving in time and produces an improved product. The dry press operation can be materially improved by applying heat to one or both dies.

Since dry ware has a pore space of approximately 30% of the volume it is evident that there is ample room for the slight amount of emulsion in the pore space so that its use does not cause reduced density or porous material. Due to the fact that emulsion is used this can be readily mixed with the water in the slip, or if desired the clay may be impregnated with the emulsion mixed with water.

The emulsion may be used in forming clay by means of the usual filter presses or where the excess moisture is removed from clay with a continuous filter. In the improved method it generally is possible to use much cheaper oils so that the method has the advantages of greater latitude in forming, the elimination of defects caused by oil pockets or straining, the elimination of labor required for removal of oil, reduced cost of the emulsion over oil, and the ability to use metal molds as well as dies for the forming of material. In many cases it is also possible to use much stiffer material in the forming operation.

The process has many applications in the forming of clay products, as the emulsion can be used to control the coefficient of friction between the clay or material being worked and metal parts. This is important in the extruding of pieces such as brick, hollow tile, tubes and other material. In the formation of hollow tile or similar objects it is frequently desirable to change the coefficient of friction at different points in order to allow the material to extrude at approximately the same rate. Where an emulsion is used it is not only possible to reduce the friction which helps materially in forming an extruded piece, but it is possible to heat sections of the die where it is desired to reduce the coefficient of friction in order to permit a freer movement of the clay so as to permit a more uniform flow for the different sections. The reduced friction will permit of more working in auger or pug mills and reduce the power required for the operation of a mill. In addition to the forming of ceramic articles, the method can be used very effectively in the forming of briquettes, tablets or other articles from material other than clay as emulsion makes it possible to release the briquette or tablet from the forming dies. Suitable emulsions will necessarily have to be used depending upon the material being formed and the use of same. In some cases emulsions must be used in which the material can be entirely evaporated by the use of heat or vacuum.

The invention is particularly applicable to the formation of ceramic ware such as tile, insulators, dishes, jugs, flower pots and other deep receptacles. In some cases one or both surfaces can be formed by stationary or rotating tools or plungers. Where both surfaces are formed by metal tools or dies, it is possible to control the coefficient of friction by regulating the relative temperature on the two faces so that the ware can be formed and released from the forming surfaces in the order desired.

Since the emulsion is always present the flow of the clay or body over the forming surface will not remove the lubricant or volatile constituent which will reduce the coefficient of friction and cause the uneven release of the piece. This sometimes happens where the surface of the clay is simply lubricated or coated. This is important, as it permits the formation of many shapes with steel or metal dies so that the piece can be formed in a single operation.

It is also possible to use softer as well as stiffer clay which facilitates the removal from the forming machine and reduces distortion in handling. The fact that the heavy oil film of the usual processes is not present permits a freer drying of the piece and shortens the time and expense of this operation.

In the forming of many ceramic articles it is necessary to form the ball of clay by successive steps. Some plastic compositions cause much difficulty in sticking to the forming equipment, making it impractical to use metal or mechanically operated parts due to the fouling of the surfaces. With the emulsion process the releasing medium is always present, so that metal or other forming parts can be used for the preliminary forming stages, saving much hand work. The tendency to foul equipment can be prevented by the proper application of heat or by regulating the temperature of the clay or composition and the emulsion.

It is evident that the temperature of the material being formed can be controlled so that the release of the forming equipment will take place with a reduction in pressure so slight that the piece will not be deformed. In some pieces containing deep recesses or where rapid operation is desirable the forming can be facilitated by the use of valves in the face of the forming equipment. This is particularly important in the forming of deep articles with straight sides where it is advisable not only to release the forming tools but to prevent suction by allowing the entrance of air to fill the large space when the forming tool is quickly removed.

The elimination of heavy oil films makes it possible to form complementary pieces of ware and join same while in the plastic state such as jugs, certain types of insulators, hollow tile and other articles, such as saggers.

The emulsion has no effect upon the final composition or density of the completed or finished piece. In all ceramic ware there is an appreciable pore space which is seldom less than 25% or 30% in the dry ware. It is, therefore, evident that where the emulsion is mixed with water that the emulsion does not require a spreading of the particles; consequently the same relation of the parts or particles making up the composition will result as in the cases where the emulsion is not used. On the other hand it is possible to use an emulsion made with waxes or possibly heavy oils in sufficient quantity so that porous material can be formed. Material of this kind may be used for forming porous plates or articles used for filtering or for controlling drying stresses.

The emulsion may also be used in removing limitations due to the mechanical characteristics of some classes of ceramic materials such as clays which have poor mechanical strength during or after the drying stage. Emulsions may be applied which will increase the mechanical strength of the ware so that the dried piece will have ample strength for handling and to resist stresses set up in the drying operation. Emulsions containing paraffin or other waxes can be used in sufficient quantities to provide the desired porosity. Increased mechanical strength can be obtained by using suitable oils in the emulsion such as linseed oil or japan drier. The materials used in the emulsion can be either evaporated during or after the drying stage or removed in the firing or burning of the ware. In some articles the constituents used in the emulsion will provide heat which will aid the firing operation to some extent.

The type and amount of emulsion required for different operations will necessarily depend upon the nature of the material, the time required in the forming and other factors such as the nature of the forming tools and the amount of heat or temperature available. Emulsions can consist of materials which provide lubrication, volatilization to reduce friction and suction, increase mechanical strength or to give open structure. Combinations of these effects can, of course, be used to obtain the desired results which are easily recognized by anyone familiar with the art. Very inexpensive emulsion can be provided, so that the process is not only suitable for the forming of high grade ware but for brick, tile and many other operations.

A few compositions which have been successfully used are as follows:

An emulsion using a solvent commonly produced by oil refineries is made up as follows:

|  | Parts |
|---|---|
| Solvent | 712 |
| Oleic acid | 64 |
| Triethanolamine | 25.6 |
| Water | 800 |

Stove oil emulsion:

|  | |
|---|---|
| Stove oil | 712 |
| Oleic acid | 64 |
| Triethanolamine | 25.6 |
| Water | 800 |

Diesel oil emulsion:

|  | |
|---|---|
| Diesel oil | 712 |
| Oleic acid | 64 |
| Triethanolamine | 25.6 |
| Water | 800 |

Paraffin wax emulsion:

|  | |
|---|---|
| Paraffin wax | 88 |
| Stearic acid | 9 |
| Triethanolamine | 3.5 |
| Water | 300 |

Linseed oil emulsion:

|  | |
|---|---|
| Boiled linseed oil | 700 |
| Oleic acid | 80 |
| Triethanolamine | 17 |
| Water | 620 |

Gasoline emulsion:

|  | |
|---|---|
| Gasoline | 712 |
| Oleic acid | 64 |
| Triethanolamine | 25.6 |
| Water | 800 |

It is evident that a wide variety of materials can be used for forming emulsions.

Successful emulsions are readily made by using various soaps, ammonia, sodium carbonate or other emulsifying agents.

One method of forming an emulsion is as follows:

Where the emulsifying agent triethanolamine with oleic acid is used the general process is to mix the triethanolamine with the water; mix the oleic acid with the oil or solvent, gradually pour the oil and acid mixture into the water and triethanolamine mixture while agitating as usual in forming emulsions.

The amount of emulsion required will depend upon the nature of the material being worked or formed. It is evident that the amount of emulsion can be varied over a wide range, amounts of solvent or Diesel oil showing very appreciable effects upon the formation with quantities of the solvent or oil as small as two or three gallons per ton of material. In higher grade materials or more difficult operations it may be desirable to use considerably larger amounts of material. Rather inexpensive oils or solvents can be used so that the cost per ton of material may amount to a few cents only for the cheaper classes of ware.

The incorporation of the emulsion with the material being formed simplifies most operations. It is possible to use this emulsion in place of lubricating oil in the formation of some pieces of ware. The fact that the emulsion can be mixed with a large quantity of water makes it possible to limit the amount of oil on the surface and effect a more uniform distribution by spraying or other means. This also tends to reduce the cost of the material used for lubricating dies and forming tools such as those used for the forming of insulators and dry press or dust material. The water contained in the emusion spray or coating sometimes helps in forming. Where heated tools are used the addition of the water also aids in the formation of steam and the release of the vacuum which is sometimes very important in the forming of dense clay bodies with a relatively small water content.

The emulsion is particularly valuable in forming pieces of wet-process ware where accuracy is desired and where the use of oil causes fault lines as in the case of insulators having threaded pin holes.

The use of an emulsion in place of oil provides a surface which is more easily glazed. Where oil is used in forming, films remaining on the ware prevent the adherence of a uniform thickness of a slip glaze resulting in bare spots and defects. To prevent defects and secure a more uniform thickness of the glaze requires sponging or other work on the ware before glazing. This is particularly important in single fired ware where the glaze is applied to the dry ware before firing. Where an emulsion is used which increases the strength of the ware in dry state it is frequently possible to glaze the dry ware without the usual biscuit firing. This applies to ware having thin sections which are weakened by the absorption of water from the glaze.

The emulsion can be made from different materials in which the relative volatile and lubricating properties may be varied to meet the forming conditions. Two or more emulsions may be added in different proportions to the clay slip or plastic clay in order to facilitate working or forming. The working properties of the emulsion can be changed over a wide range by using different proportions of lubricating and volatile constituents in the oil before making up the emulsion. In the formation of extruded parts such as tile the volatile constituent is not so important as the lubricating property, particularly if the dies are not heated, consequently emulsions in which lubrication is important will be used in preference to emulsions using high volatile constituents. Where ware is formed with closed pockets or grooves, a volatile constituent is generally important in permitting at least an initial release of the plastic or other material from the face of the forming tool or die. Some lubrication may also be necessary depending upon the method of forming and the shape of the piece. If the forming operating indicates that more lubrication is required, the amount of emulsion having the lubricating constituent may be increased. If on the other hand the piece is such that a free release is required so as to prevent the effects of suction, the emulsion having a volatile constituent can be increased.

It is evident that where a volatile constituent is required that the required boiling point or temperature of vaporization of the constituent will depend upon the temperature of the forming tools as well as the permissible reduction in pressure between the forming face and the plastic material. Where the plastic material will permit of an appreciable reduction in the pressure below the atmospheric pressure without causing distortion of the formed ware, vaporization will take place at a lower temperature and, therefore, a less volatile constituent can be used in the emulsion.

The emulsion has many applications due to the fact that oil pockets which cause small faults are eliminated or reduced to a negligible point. Where saggers are pressed from plastic material, it is customary to use considerable oil in the forming dies. This oil fills small spaces which reduces the bond between adjacent portions of the plastic material and between the plastic material and the grog. This has the effect of producing small defects or checks which in turn reduces the mechanical strength and the life of the sagger. Where an emulsion is used the small defects produced by the ordinary lubricating oil are eliminated resulting in an improved product. The having in time in oiling the dies is also an appreciable factor in the cost of production. Where the strength of the sagger is increased it is possible to reduce the thickness of the sagger resulting in a considerable saving of material.

It is evident that lubricating or volatile oils cannot be mixed directly with plastic clay without producing weak places or faults. Furthermore the lubricating or solvent oils cannot mix with the slip, as they will simply float on the surface. Where a proper emulsion is made, however, this may be mixed directly with the water making up the clay slip or with the plastic material in the kneading process. This makes it possible to produce a very uniform distribution of the lubricating and volatile elements without producing segregation which will cause voids or weak places in the finished article. With the emulsion described it is possible for anyone familiar with the art to readily make up an emulsion which will facilitate the forming of the ware, as the properties of the emulsion can be varied to meet a wide range of conditions required by the differences in the material being worked and in the type of equipment used in the working or forming.

A single emulsion can be used comprising a mixture of hydrocarbons for producing lubrication and others which have a vapor tension such that a release between the forming tool and the plastic material will be obtained at low or even at room temperatures. Highly volatile hydrocarbons such as butane, pentane, hexane and others have vapor tensions such that they will readily volatilize under the reduced pressure or suction developed when the forming tool or surface is removed from the plastic material, thereby providing the necessary release.

In the formation of some types of ware lubrication is not necessary or important. It is, however, necessary to release the tool or forming surface from the plastic material. An emulsion having a suitable vapor tension which will permit release under the reduced pressure when the forming tool is removed from the surface can be used to at least start this release. As the temperature of the forming tool or surface is raised less volatile hydrocarbons can be used. While the emulsion will permit the initial release from the plastic material, it may be necessary to permit the entrance of air through suitable valves in order to prevent deformation of the plastic material. While a valve or other means can be used to equalize the pressure in the space formed between the plunger or tool by the removal of the latter, the valve cannot effect a release except in the immediate vicinity. It is, therefore, evident that some initial release is necessary to prevent distortion before a valve can be used effectively to equalize the pressure in the pocket formed by the removal of a forming tool or die.

Where an emulsion is used which requires heat from the forming tool or die to effect a release, it is apparent that when the forming tool or surface is separated from the plastic material that heat transfer from the forming surface to the plastic material will be so reduced that volatilization tending to reduce the suction may not be sufficient to allow a free release of the forming tool. If, however, an emulsion is used to effect the initial release valves or other means can be used to permit the entrance of air so as to equalize the pressure in the pocket formed by the removal of the forming tool. In this way it is possible to use a very small amount of emulsion and prevent distortion of the plastic material even though large pockets are formed when the plungers or forming tools are removed from the plastic material.

We claim:

1. The method of forming articles from plastic material comprising the steps of applying an emulsion comprising an aqueous suspension of hydrocarbon to the plastic material from which the article is formed and forming the article while the material is dampened with the emulsion.

2. The method of working plastic material comprising the step of mixing an emulsion comprising an aqueous suspension of hydrocarbon with the material and working the material while dampened with the emulsion to facilitate working thereof.

3. The method of forming articles from plastic material comprising the steps of mixing an emulsion comprising an aqueous suspension of hydrocarbon with the material from which the article is to be formed and forming the article by the application of a forming tool to the surface thereof while the material is dampened with the emulsion to facilitate movement of the tool relative to said surface.

4. The method of forming articles from plastic material comprising the steps of mixing with the material an emulsion comprising an aqueous suspension of a volatile substance and applying a forming tool to the surface of the material while the material is dampened with said emulsion to facilitate separation of said tool from said surface due to volatilization of said emulsion.

5. The method of forming articles from plastic material comprising the steps of treating the material with a lubricating emulsion comprising an aqueous suspension of a lubricant and moving a forming tool over the surface of the material to form the same while said surface is dampened by said emulsion so that the emulsion acts as a lubricant to facilitate such movement and to prevent the material from adhering to the tool.

6. The method of forming articles from plastic material comprising the steps of treating the material with a volatile emulsion, and applying a heated forming tool to the surface of the material while dampened with the emulsion, the emulsion being volatilized by the heat from the tool and serving to free the tool from the surface of the material.

7. The method of working plastic material comprising the steps of mixing a lubricating emulsion comprising an aqueous suspension of hydrocarbon with the material and passing the material in a plastic state through a mixing mill while the material is lubricated by said emulsion.

8. The method of forming ceramic articles comprising the steps of mixing a lubricating emulsion with plastic clay and extruding the material while lubricated by said emulsion.

9. The method of forming ceramic articles comprising the steps of mixing plastic ceramic material with an emulsion comprising an aqueous suspension of hydrocarbon, forming separate parts while dampened with said emulsion from said material and joining said parts to form an article the emulsion facilitating adherence of the joined parts.

10. The method of forming electric insulators comprising the steps of treating plastic ceramic material with an emulsion of a lubricating material in water, moving a forming tool over the surface of said material to shape said material, while the material is dampened with said emulsion and withdrawing said tool from said surface while still so dampened so that the emulsion serves as a lubricant to facilitate movement of said tool and also acting to facilitate separation of the face of said tool from the surface of said material.

11. The method of manufacturing electric insulators comprising the steps of treating a plastic ceramic material with an emulsion of a volatile lubricant in water, and, while said material is dampened with said emulsion, forming said material by a heated forming tool so that said emulsion serves to facilitate movement of said tool relative to said material, said emulsion, by vaporization also acting to free said tool from the surface of said material.

12. The method of forming ceramic articles comprising the treatment of plastic ceramic material with an emulsion of lubricating material in water, relatively moving said plastic material and a forming surface while said material is dampened with said emulsion and heating portions of said forming surface at points where greater ease of movement is required to facilitate correct forming of said plastic material.

13. The method of forming plastic articles such as hollow tile or brick from plastic material including a lubricating emulsion comprising an aqueous suspension of hydrocarbon, said method comprising the application of heat to the forming die to reduce the coefficient of friction at points of greatest drag and relatively moving said material and die in contact with each other at said points while said material is dampened with said emulsion.

14. The formation of ceramic ware of plastic material including the addition of volatile and lubricating emulsions to the plastic material and forming said material while wet with said emulsion to control the coefficient of friction between the material and the forming surface and effect their release.

ARTHUR O. AUSTIN.
LESLIE W. AUSTIN.